United States Patent
Barsness et al.

(10) Patent No.: US 7,685,170 B2
(45) Date of Patent: Mar. 23, 2010

(54) JOURNALING DATABASE QUERIES FOR DATABASE REPLICATION

(75) Inventors: Eric Lawrence Barsness, Pine Island, MN (US); John Matthew Santosuosso, Rochester, MN (US); John A. Stroh, Eagen, MN (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 11/197,604

(22) Filed: Aug. 4, 2005

(65) Prior Publication Data
US 2007/0033181 A1 Feb. 8, 2007

(51) Int. Cl.
*G06F 12/00* (2006.01)
(52) U.S. Cl. ............................ 707/202; 711/162
(58) Field of Classification Search ............... None
See application file for complete search history.

(56) References Cited

U.S. PATENT DOCUMENTS

| | | | | |
|---|---|---|---|---|
| 5,574,897 | A * | 11/1996 | Hermsmeier et al. ............ | 707/1 |
| 5,642,505 | A * | 6/1997 | Fushimi ....................... | 707/204 |
| 5,737,601 | A * | 4/1998 | Jain et al. ..................... | 707/201 |
| 5,778,390 | A * | 7/1998 | Nelson et al. ................. | 707/204 |
| 5,806,075 | A * | 9/1998 | Jain et al. ..................... | 707/201 |
| 5,852,820 | A * | 12/1998 | Burrows ........................ | 707/2 |
| 5,873,096 | A * | 2/1999 | Lim et al. ..................... | 707/201 |
| 6,092,083 | A * | 7/2000 | Brodersen et al. ............ | 707/201 |
| 6,189,011 | B1 * | 2/2001 | Lim et al. ..................... | 707/102 |
| 6,769,054 | B1 * | 7/2004 | Sahin et al. ................... | 711/162 |
| 6,775,826 | B1 * | 8/2004 | Zahavi et al. ................. | 717/128 |
| 6,915,305 | B2 * | 7/2005 | Subramanian et al. ....... | 707/102 |
| 6,938,035 | B2 * | 8/2005 | Driesch et al. ................ | 707/3 |
| 7,010,516 | B2 * | 3/2006 | Leslie ........................... | 707/2 |
| 7,171,408 | B2 * | 1/2007 | Zuzarte ......................... | 707/5 |
| 7,181,479 | B2 * | 2/2007 | Suzuki et al. ................. | 707/204 |
| 2002/0016771 | A1 * | 2/2002 | Carothers et al. ............. | 705/43 |
| 2003/0065648 | A1 * | 4/2003 | Driesch et al. ................ | 707/2 |
| 2003/0212789 | A1 * | 11/2003 | Hamel et al. .................. | 709/225 |
| 2003/0221187 | A1 * | 11/2003 | Barsness et al. .............. | 717/129 |

(Continued)

FOREIGN PATENT DOCUMENTS

EP 1143362 A2 * 10/2001

OTHER PUBLICATIONS

Bhargava, et al., "Relational Database Systems with Zero Information Loss," IEEE Transactions of Knowledge & Data Engineering, vol. 5, No. 1, Feb. 1993.*

*Primary Examiner*—Hung Q Pham
*Assistant Examiner*—Hubert Cheung
(74) *Attorney, Agent, or Firm*—Martin & Associates, LLC (57) ABSTRACT

A database journal mechanism stores both row operations and database queries in a database journal. The database queries in the journal provide significant additional information that may be used in a number of different ways. For example, a database replication send mechanism in accordance with the preferred embodiments could read a database query in the journal and determine that the query affects several rows. The database replication send mechanism could then transmit the database query to the computer system that hosts the replicated database. A database replication receive mechanism in accordance with the preferred embodiments receives the database query, and executes the database query on the replicated database. As a result, the transmission of a single database query can replace the transmission of many row operations.

11 Claims, 7 Drawing Sheets

U.S. PATENT DOCUMENTS

| | | | |
|---|---|---|---|
| 2003/0225768 A1* | 12/2003 | Chaudhuri et al. | 707/10 |
| 2004/0010488 A1* | 1/2004 | Chaudhuri et al. | 707/3 |
| 2004/0073831 A1* | 4/2004 | Yanai et al. | 714/7 |
| 2005/0267866 A1* | 12/2005 | Markl et al. | 707/2 |
| 2006/0020579 A1* | 1/2006 | Freedman et al. | 707/3 |
| 2006/0031200 A1* | 2/2006 | Santosuosso | 707/3 |
| 2007/0038823 A1* | 2/2007 | Banks | 711/162 |
| 2007/0271224 A1* | 11/2007 | Essafi et al. | 707/3 |

* cited by examiner

Create table TEST
Insert (10 records) into TEST
Delete * FROM TEST

FIG. 9

| Seq. | Code | Type | Object | Library | Job | Time |
|---|---|---|---|---|---|---|
| 1 | J | PR | | | Job1 | 10:17:41 |
| 2 | D | CT | TEST | PROP | Job1 | 10:17:57 |
| 3 | R | PT | TEST | PROP | Job1 | 10:18:10 |
| 4 | R | PT | TEST | PROP | Job1 | 10:18:10 |
| 5 | R | PT | TEST | PROP | Job1 | 10:18:10 |
| 6 | R | PT | TEST | PROP | Job1 | 10:18:11 |
| 7 | R | PT | TEST | PROP | Job1 | 10:18:11 |
| 8 | R | PT | TEST | PROP | Job1 | 10:18:11 |
| 9 | R | PT | TEST | PROP | Job1 | 10:18:12 |
| 10 | R | PT | TEST | PROP | Job1 | 10:18:12 |
| 11 | R | PT | TEST | PROP | Job1 | 10:18:12 |
| 12 | R | PT | TEST | PROP | Job1 | 10:18:13 |
| 13 | R | DL | TEST | PROP | Job1 | 10:18:26 |
| 14 | R | DL | TEST | PROP | Job1 | 10:18:26 |
| 15 | R | DL | TEST | PROP | Job1 | 10:18:26 |
| 16 | R | DL | TEST | PROP | Job1 | 10:18:26 |
| 17 | R | DL | TEST | PROP | Job1 | 10:18:26 |
| 18 | R | DL | TEST | PROP | Job1 | 10:18:26 |
| 19 | R | DL | TEST | PROP | Job1 | 10:18:26 |
| 20 | R | DL | TEST | PROP | Job1 | 10:18:26 |
| 21 | R | DL | TEST | PROP | Job1 | 10:18:26 |
| 22 | R | DL | TEST | PROP | Job1 | 10:18:26 |

FIG. 10    Prior Art

| Seq. | Code | Type | Object | Library | Job | Time |
|---|---|---|---|---|---|---|
| 1 | J | PR | | | Job1 | 10:17:41 |
| 2 | D | CT | TEST | PROP | Job1 | 10:17:57 |
| 3 | R | PT | TEST | PROP | Job1 | 10:18:10 |
| 4 | R | PT | TEST | PROP | Job1 | 10:18:10 |
| 5 | R | PT | TEST | PROP | Job1 | 10:18:10 |
| 6 | R | PT | TEST | PROP | Job1 | 10:18:11 |
| 7 | R | PT | TEST | PROP | Job1 | 10:18:11 |
| 8 | R | PT | TEST | PROP | Job1 | 10:18:11 |
| 9 | R | PT | TEST | PROP | Job1 | 10:18:12 |
| 10 | R | PT | TEST | PROP | Job1 | 10:18:12 |
| 11 | R | PT | TEST | PROP | Job1 | 10:18:12 |
| 12 | R | PT | TEST | PROP | Job1 | 10:18:13 |
| 13 | R | SQ | TEST | PROP | Job1 | 10:18:26 |
| 14 | R | DL | TEST | PROP | Job1 | 10:18:26 |
| 15 | R | DL | TEST | PROP | Job1 | 10:18:26 |
| 16 | R | DL | TEST | PROP | Job1 | 10:18:26 |
| 17 | R | DL | TEST | PROP | Job1 | 10:18:26 |
| 18 | R | DL | TEST | PROP | Job1 | 10:18:26 |
| 19 | R | DL | TEST | PROP | Job1 | 10:18:26 |
| 20 | R | DL | TEST | PROP | Job1 | 10:18:26 |
| 21 | R | DL | TEST | PROP | Job1 | 10:18:26 |
| 22 | R | DL | TEST | PROP | Job1 | 10:18:26 |
| 23 | R | DL | TEST | PROP | Job1 | 10:18:26 |

1110 → (row 13)

JOURNALING DATABASE QUERIES FOR DATABASE REPLICATION

BACKGROUND OF THE INVENTION

1. Technical Field

This invention generally relates to computer database systems, and more specifically relates to journal mechanisms and methods for computer database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result. Structured Query Language (SQL) is one specific query language that may be used to query a database.

Changes to a database are typically stored in a database journal. Known database journals contain each change to a database on a row-by-row basis. This means that if 20 rows in a database are deleted, a corresponding 20 entries are made to the database journal, one entry for each deleted row. These row-by-row entries in the database journal may be used for different purposes. For example, if a database transaction fails, the information stored in the database journal may be used to roll back the transaction to put the database in the proper state before the transaction was commenced.

In another example, the data stored in a database journal may be used to maintain a replicated database. Many modern database systems have a primary database that is normally used, but also maintain a replicated (or mirrored) database that contains the same information as the primary database. In the event that the primary database fails, the system can quickly switch to the replicated database, thereby minimizing system downtime. One known way to replicate a database transmits journal entries from the primary database to the replicated database, which are then applied to the replicated database. One problem with this approach is that the journal contains an entry for each row operation, which must then be transmitted to the replicated database. Because replicated databases are typically on a different computer system, each journal entry must be transmitted via a network connection to the computer system that hosts the replicated database. The transmission of each journal entry consumes significant network bandwidth. Without a way to replicate a database without transmitting each row operation in a journal, the computer industry will continue to suffer from inefficient methods of database replication using known journal entries.

DISCLOSURE OF INVENTION

According to the preferred embodiments, a database journal mechanism stores both row operations and database queries in a database journal. The database queries in the journal provide significant additional information that may be used in a number of different ways. For example, a database replication send mechanism in accordance with the preferred embodiments could read a database query in the journal and determine that the query affects several rows. The database replication send mechanism could then transmit the database query to the computer system that hosts the replicated database. A database replication receive mechanism in accordance with the preferred embodiments receives the database query, and executes the database query on the replicated database. As a result, the transmission of a single database query can replace the transmission of many row operations.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to database journaling. For those not familiar with databases or journaling, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. Note that an SQL query is expressed in terms of columns defined on one or more database tables. Information about the internal storage of the data is not required as long as the query is written in terms of expressions that relate to values in columns from tables.

Known Database Journaling

Prior art database journals include an entry for each and every row operation that affects the database. By providing each row operation, the journal information is detailed enough to allow unrolling a transaction that fails using the journal entries and to allow replicating a database using the journal entries.

Known Database Replication Using Known Journal Entries

Figure 5:
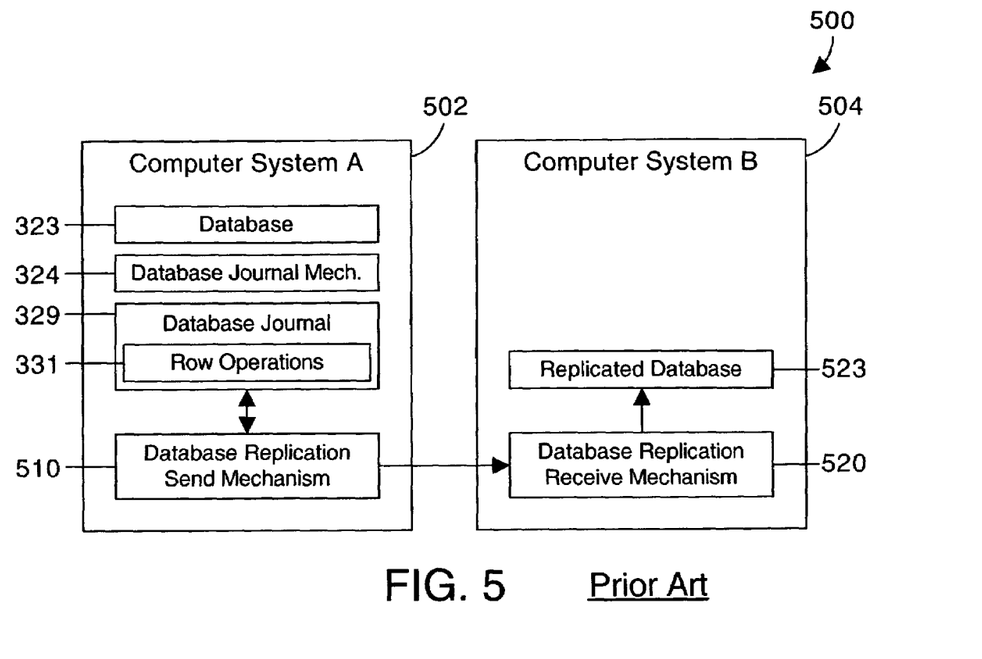
FIG. 5 is a block diagram of a prior art system for replicating a database using database journal entries that specify row operations.

A database may be replicated using known database journal entries. A prior art system 500 for replicating a database is shown in FIG. 5. A first computer system 502 includes a database 323 that needs to be replicated. A database journal mechanism 324 creates a database journal 329 that includes a list of row operations 331 that have been performed on the database 323. A database replication send mechanism 510 transmits each row operation 331 represented by entries in database journal 329 to a different computer system 504 that hosts a replicated database 523. A database replication receive mechanism 520 receives the row operations 331 from the database replication send mechanism 510, and applies those row operations 331 to the replicated database 523. Note that the database replication send mechanism 510 may send the row operations 331 one at a time, or may group the row operations 331 into batches. The database replication receive mechanism 520 maintains the replicated database 523 by applying the row operations 331 to the replicated database 523.

Figure 6:
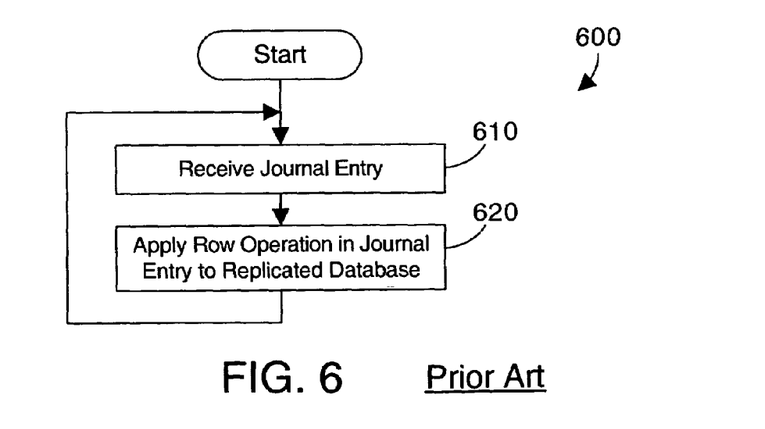
FIG. 6 is a flow diagram of a prior art method for the database replication receive mechanism of FIG. 5.

Referring to FIG. 6, a prior art method 600 for the database replication receive mechanism 520 receives a journal entry (step 610), then applies the row operation in the journal entry to the replicated database (step 620). In this manner, a database replication mechanism that includes send mechanism 510 and receive mechanism 520 maintains the replicated database 523 by transmitting all of the journal entries from the first computer system 502 to the second computer system 504.

Transmitting each entry in a database journal consumes significant network bandwidth. For example, if a DELETE statement is executed that deletes 500 rows in a database table, there will be 500 corresponding journal entries that are written to the database journal, one per deleted row. Transmitting all 500 of these journal entries to the computer system that hosts the replicated database is inefficient. The preferred embodiments overcome this inefficiency by storing database queries to the journal in addition to the row operations.

2.0 Description of the Preferred Embodiments

The preferred embodiments recognize that it is inefficient and wasteful of system resources to transmit each and every row operation in a database journal to a computer system that hosts a replicated database. In addition to writing row operations to a database journal, database queries, such as SQL statements, may also be written to the database journal. A data replication mechanism may then determine that a database query affects many rows, and may transmit the database query in the database journal to the computer system that hosts the replicated database. The transmitted database query may then be executed on the replicated database, thereby eliminating the need for transmitting all of the row operations that were performed when executing the query. The preferred embodiments extend beyond database replication to the storing of database queries in addition to row operations to a database journal, and to any suitable use of the stored information in the database journal.

Figure 1:
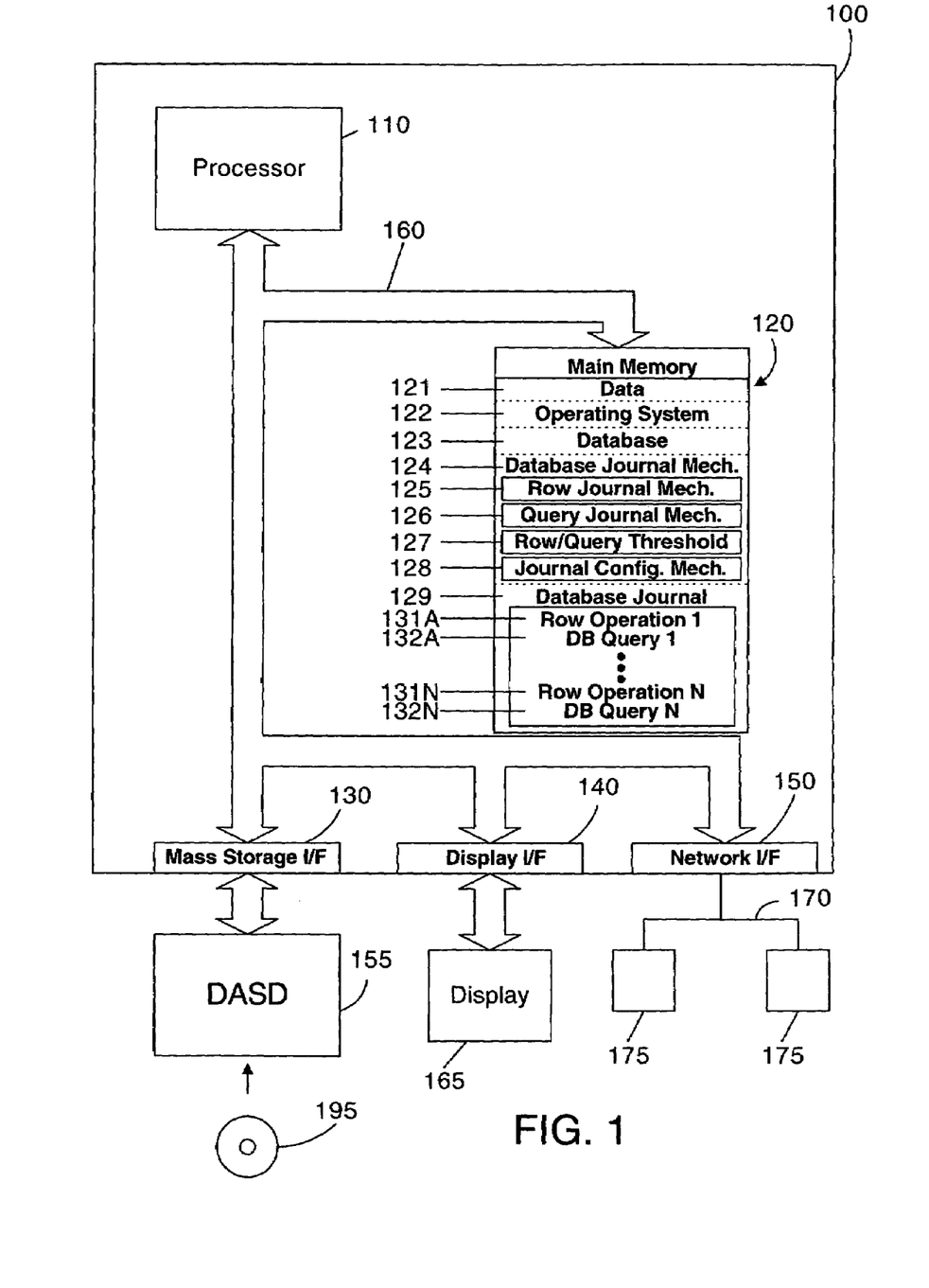
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM ESERVER ISERIES computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database journal mechanism 124, and a database journal 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Database journal mechanism 124 preferably includes a row journal mechanism 125, a query journal mechanism 126, a row/query threshold 127, and a journal configuration mechanism 128. The row journal mechanism 125 stores row operations to the database journal 129. Examples of row operations include row operations 131A, . . . , 131N in FIG. 1. The query journal mechanism 126 stores database queries, such as SQL statements, to the database journal 129. Examples of queries stored in database journal 129 include database queries 132A, . . . , 132N in FIG. 1. The row/query threshold 127 is a specification that determines when the query journal mechanism stores a query to the database journal 129. One simple example of row/query threshold 127 is an ordinal number. For example, if the row/query threshold is set to 10, queries that affect more than 10 rows will be written to the database journal 129, while queries that affect 10 rows or less will not be written to the database journal. The row/query threshold 127 thus allows the query journal mechanism 126 to determine when to store a query to the database journal 129. Queries that affect a relatively small number of rows may not be stored in the database journal 129. Of course, the row/query threshold could be set to zero, which would indicate to the query journal mechanism 126 that all queries should be stored to the database journal 129. The row/query threshold 127 could also be a number that is dynamically computed according to characteristics of the database. In addition, the row/query threshold 127 could be any suitable heuristic for determining when a query should be written to the database journal 129. Note that row/query threshold 127 may also specify a time of day, user ID, system load, or other suitable parameters that determine whether or not queries and row operations are stored to the journal.

The journal configuration mechanism 128 provides a way to configure when the query journal mechanism 126 stores queries to the database journal 129. For example, the journal configuration mechanism 128 could include a graphical user interface that allows a system administrator to configure the query journal mechanism 126 to store all update statements, but to not store insert or delete statements. The journal configuration mechanism 128 allows selectively storing only particular types of database queries in the database journal 129, or database queries that satisfy specified parameters. In this manner, the storing of database queries in the database journal 129 can be truly selectable according to desired performance and system parameters.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database journal mechanism 124, and database journal 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
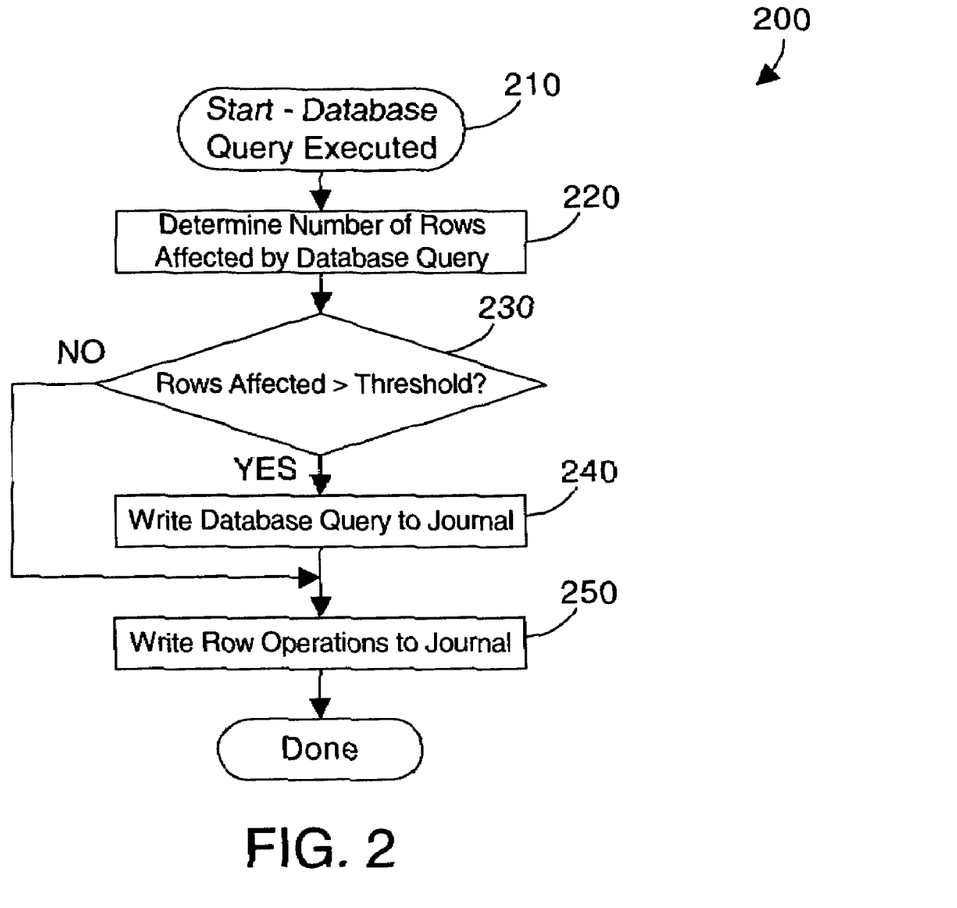
FIG. 2 is flow diagram of a method in accordance with the preferred embodiments for the database journal mechanism of FIG. 1 to journal a database query.

Referring to FIG. 2, a method 200 in accordance with the preferred embodiments represents steps that may be performed by the query journal mechanism 126 in FIG. 1 to determine when a database query is written to the journal. Method 200 begins when a database query is executed (step 210). The number of rows affected by the database query is determined (step 220). For this simple example, we assume that the row/query threshold is an ordinal number, such as 10. If the number of rows affected is greater than the row/query threshold (step 230=YES), the database query is written to the journal. The row operations that result from executing the query are also written to the journal (step 250). If the number of rows affected is less than or equal to the row/query threshold (step 230=NO), the database query is not written to the journal, only the row operations that result from executing the database query are written to the journal (step 250).

Figure 3:
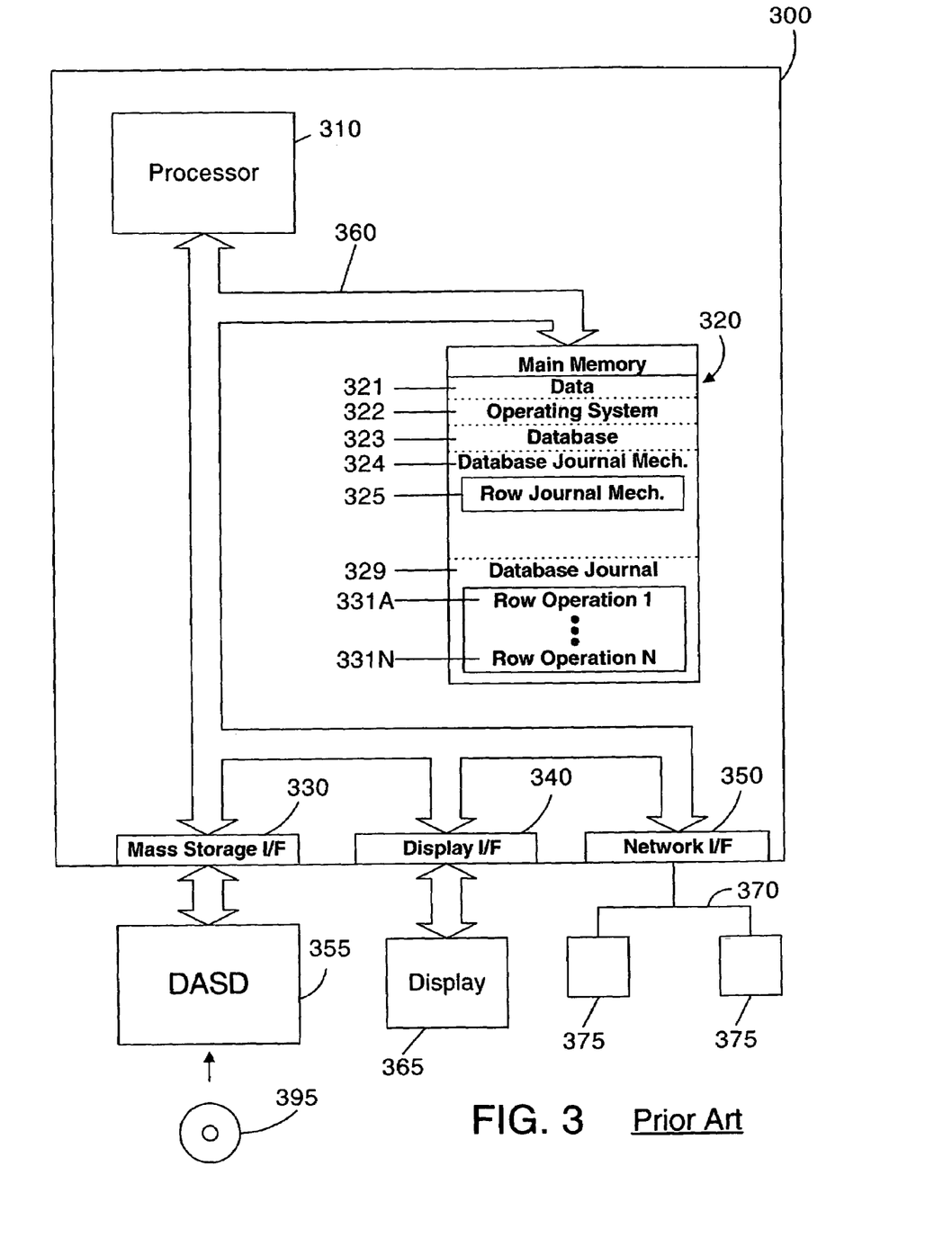
FIG. 3 is block diagram of a prior art apparatus.
Figure 4:
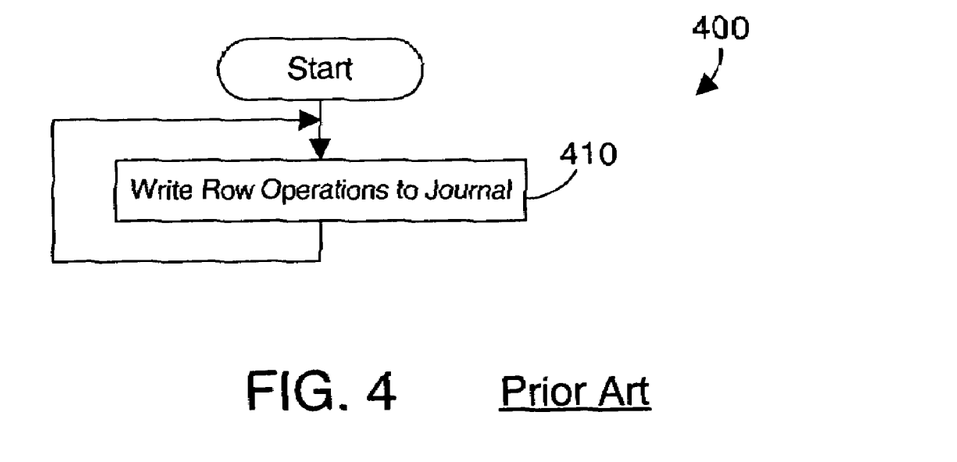
FIG. 4 is a flow diagram of a prior art method for journaling database row operations for the database journal mechanism of FIG. 3.

We can now compare the computer system 100 in FIG. 1 and the method 200 in FIG. 2 in accordance with the preferred embodiments with a prior art computer system 300 in FIG. 3 and corresponding prior art method 400 in FIG. 4. Note that the processor 310, mass storage interface 330, display interface 340, network interface 350, system bus 360, DASD 355, display 365, network 370, workstations 375, and CD RW 395 are preferably the same as the features shown in FIG. 1 and described in detail above. The primary difference is in the database journal mechanism 324 and the database journal 329. The database journal mechanism 324 only includes a row journal mechanism 325, because only row operations 331A, ..., 331N are stored in the database journal 329. As shown in method 400 in FIG. 4, the database journal mechanism 324 only writes row operations to the journal (step 410).

In the prior art, no queries are written to the database journal 329 by the database journal mechanism 324.

The prior art system 500 in FIG. 5 and method 600 in FIG. 6 are discussed above in the Overview section. Using prior art journals that contain only row operations to replicate a database results in transmitting each and every journal entry to the computer system that hosts the replicated database. Transmitting this much journal data requires significant network bandwidth, which can negatively impact system performance.

Figure 7:
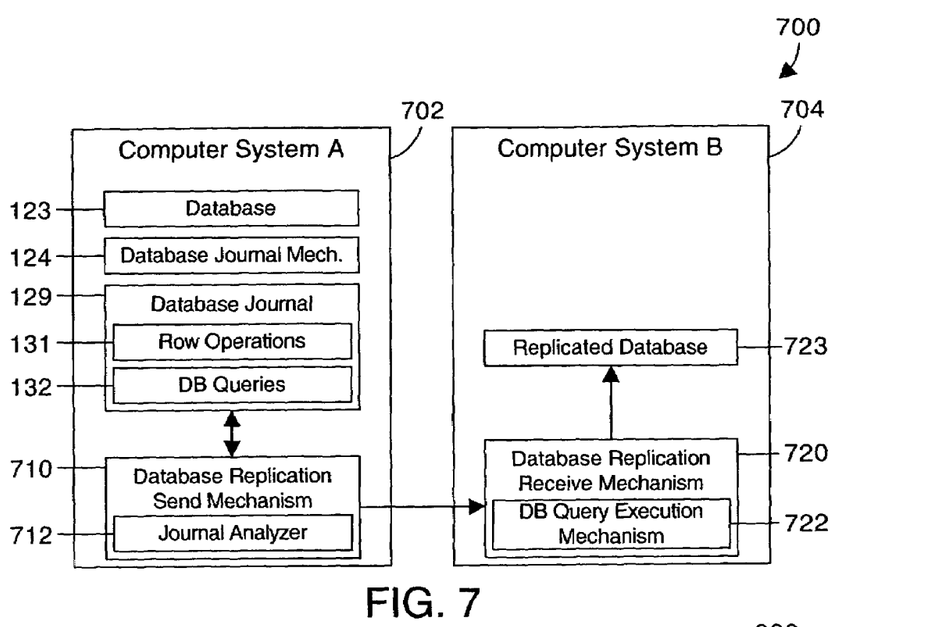
FIG. 7 is a block diagram of a system in accordance with the preferred embodiments for replicating a database using database journal entries that include database queries.

Referring now to FIG. 7, a system 700 in accordance with the preferred embodiments includes two computer systems 702 and 704, with computer system 702 hosting the primary database 123 and computer system 704 hosting a replicated database 723. The database journal mechanism 124 in FIG. 7 is not shown with the many components shown in FIG. 1, but it is understood that these components are preferably present. The database journal mechanism 124 writes both row operations 131 and database queries 132 to the database journal 129. In the prior art, only row operations are written to the database journal. By selectively including database queries 132 in the database journal 129, data replication may be performed without transmitting all of the row operations 131 in the database journal 129 to the computer system 704 that hosts the replicated database 723.

Computer system 702 includes a database replication send mechanism 710, which includes a journal analyzer 712. The journal analyzer 712 looks at a database query 132 stored in the database journal 129, determines from the row operations 131 the number of rows affected, and decides whether to send the database query or the corresponding row operations to the computer system 704 that hosts the replicated database 723. Note that journal analyzer 712 preferably operates according to some predefined threshold that may be an ordinal number, that may be defined by dynamically analyzing the database, or that may be any suitable heuristic for determining whether to send a database query or the corresponding row operations to the computer system 704 that hosts the replicated database 723. Note also that the threshold for determining whether the journal analyzer 712 sends a database query or its corresponding row operations can be a completely different threshold than the row/query threshold that is used to determine whether to store a database query to the database journal. Of course, the journal analyzer 712 could also use the row/query threshold 127 to decide to send only the database query when the number of row operations exceeds the row/query threshold 127, and to send only the row operations when the number of row operations is less than or equal to the row/query threshold 127. When the database replication send mechanism 710 encounters a database query 132 in the journal 129, and the journal analyzer 712 decides to transmit the database query to the computer system 704 that hosts the replicated database 723, the row operations in the database journal that correspond to the transmitted query can be skipped, and need not be transmitted to the other computer system. Thus, if a DELETE * statement is executed that deletes 500 rows in a table, the DELETE * statement may be transmitted to the computer system 704, thereby eliminating the transmission of the 500 row operations in the journal that correspond to the 500 row deletions.

The database replication send mechanism 710 may transmit row operations 131 and one or more database queries 132 to the database replication receive mechanism 720. When the database replication receive mechanism 720 receives a database query from the database replication send mechanism 710, the database replication receive mechanism 720 knows that the query needs to be executed on the replicated database. As a result, a database query execution mechanism 722 executes the query on the replicated database 723. For the simple example above with the DELETE * statement that deletes 500 rows, the replicated database 723 is thus maintained without the need of transmitting all 500 row operations to the computer system 704 that includes the replicated database 723. The net result is that 499 network messages are avoided by using the data replication apparatus and method in accordance with the preferred embodiments, which improves system performance.

Figure 8:
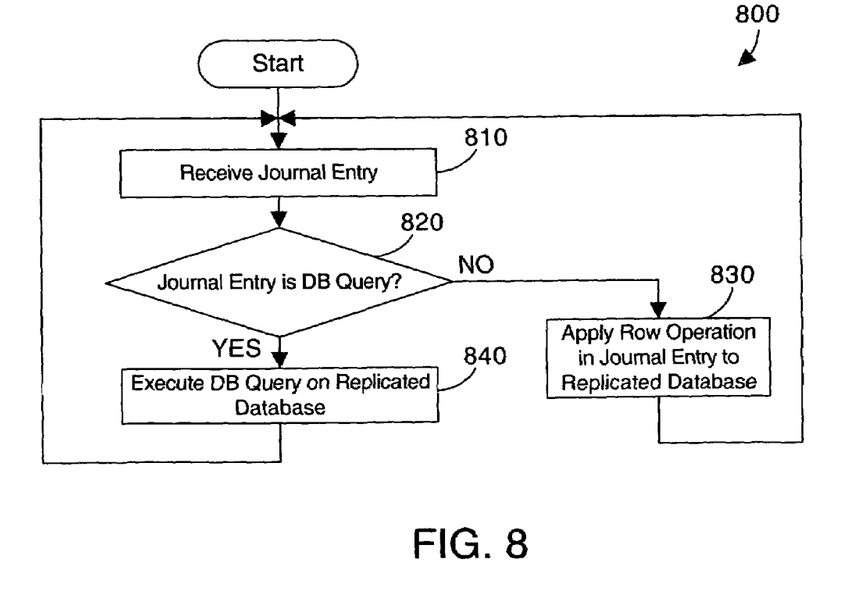
FIG. 8 is a flow diagram of a method in accordance with the preferred embodiments for the database replication receive mechanism of FIG. 7.

Referring to FIG. 8, a method 800 is preferably performed by the database replication receive mechanism 720 in FIG. 7. A journal entry is received (step 810). If the journal entry is a database query (step 820=YES), the query is executed on the replicated database (step 840). If the journal entry is not a database query (step 820=NO), it is a row operation, so the row operation is applied to the replicated database (step 830). The preferred embodiments thus journal both row operations and database queries, and allow intelligently determining which to use according to desired system performance parameters. In the data replication environment shown in FIGS. 7 and 8, by choosing to send a database query when a large number of rows are affected, the individual row operations corresponding to those large number of rows need not be sent, because the database query may be executed directly on the replicated database, thereby eliminating the need for sending the individual corresponding row operations.

Figure 9:
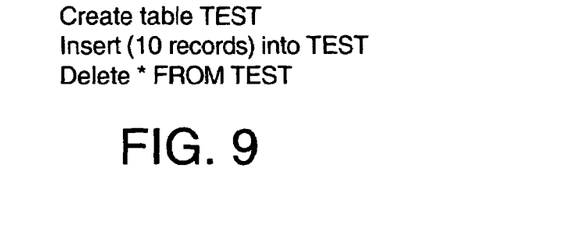
FIG. 9 shows a set of sample operations for illustrating the database journal mechanism of the preferred embodiments.
Figure 10:
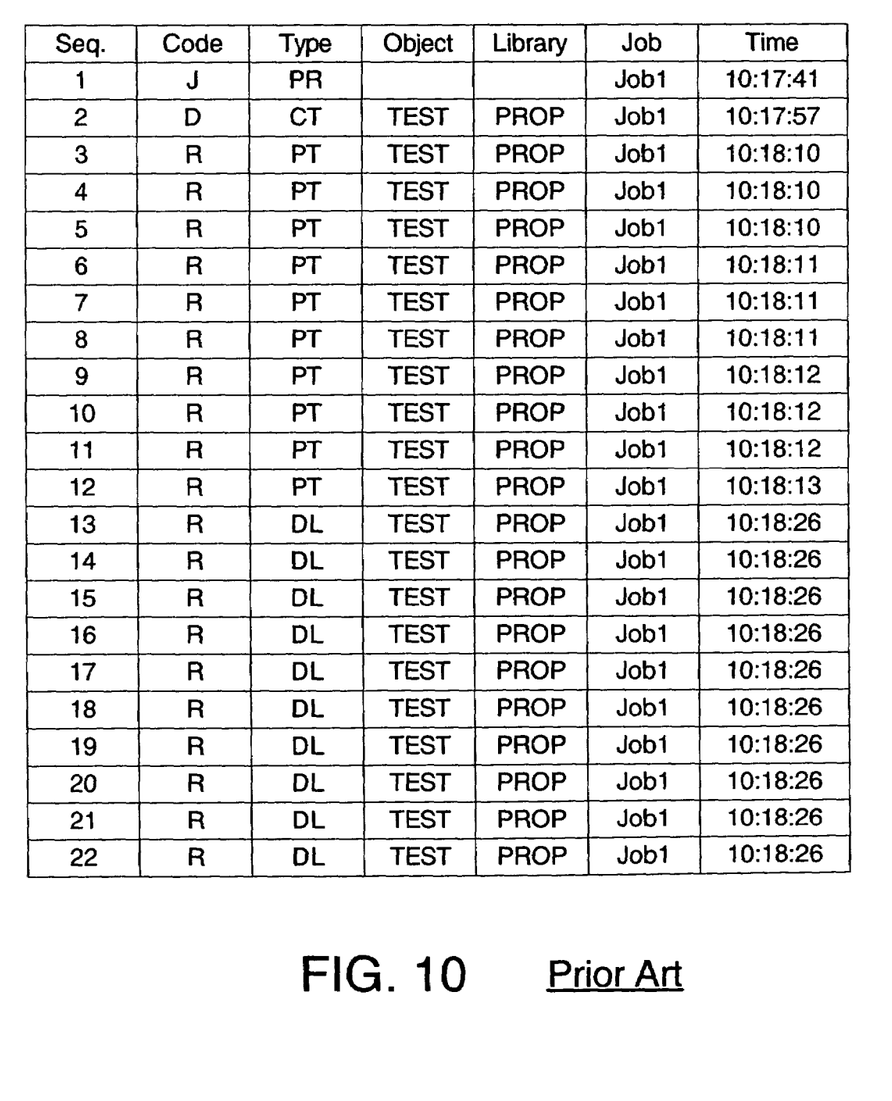
FIG. 10 is a prior art journal for the sample operations shown in FIG. 9.

A simple example is now given that illustrates the advantages of the preferred embodiments in a data replication environment, such as shown in FIGS. 7 and 8. FIG. 9 shows operations that may be performed. First, a table called TEST is created. Next, 10 records are inserted into the TEST table, one record at a time. Finally, a DELETE * FROM TEST statement (or query) specifies that all 10 records just inserted need to be deleted. The resulting prior art database journal is shown in FIG. 10. The sequence number in the left column is an ordinal number that starts with one and increases one for each journal entry. The Code column indicates what kind of journal entry was deposited, where J represents a journal or journal receiver operation, D represents a database file operation, and R represents a record-level operation. The Type column indicates the type of operation being performed. For this example, a type PR means that a new journal receiver is being attached to the current journal; a type CT means a create table operation; a type PT is an insert (put) row operation; and a type DL is a delete row operation. The Object column specifies the table name being affected by the operation, namely TEST. The Library column specifies where the object or table resides. The Job column specifies the name of the job that performed the operation. The Time column specifies a time stamp for each operation in the journal. Reviewing the data in the journal, we see from record 1 that the journal was created at 10:17:41. Record 2 shows the object TEXT was created at 10:17:57. Records 3-5 show the insertion of three records into the TEST table at 10:18:10. Records 6-8 shown the insertion of three records into the TEST table at 10:18:11. Records 9-11 show the insertion of three records into the TEST table at 10:18:12. Record 12 shows the insertion of a record into the TEXT table at 10:18:13. At this point, all ten insertions have been made. We assume that the DELETE * FROM TEST is then executed, which deletes the ten rows that were inserted in the row operations in records 3-12. The individual delete row operations are shown in records 13-22. As explained above with reference to FIG. 5, in the prior art, the deletion of the 10 records results in transmitting all ten delete row operations in records 13-22 to the computer system 504 that hosts the replicated database 523. This overhead is eliminated in the preferred embodiments as shown by the journal in FIG. 11.

Figure 11:
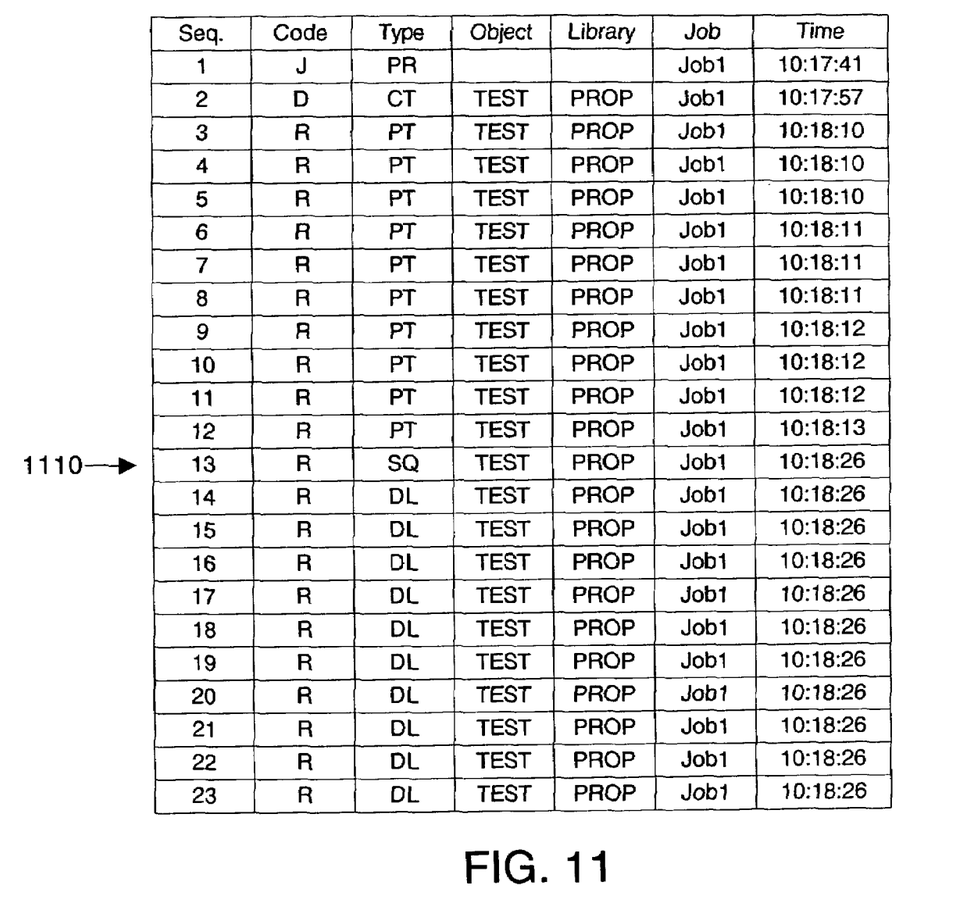
FIG. 11 is a journal in accordance with the preferred embodiments for the sample operations shown in FIG. 9.

The journal in FIG. 11 is identical to the journal in FIG. 10 for records 1-12. Note, however, that the journal in FIG. 11 of the preferred embodiments includes a database query at record 13, identified by the arrow at 1110. This journal entry has a type SQ, meaning this is an SQL query. Note that the row operations corresponding to the delete statement are still stored in the journal at records 14-23. However, when the database replication send mechanism 710 in FIG. 7 reads the SQL query in record 13, the journal analyzer 712 may elect to transmit the SQL query in record 13 to the database replication receive mechanism 720. If the SQL query in the journal is sent, the corresponding row operations in records 14-23 need not be sent, because the SQL query will be executed directly on the replicated database 723 by the database query execution mechanism 722. As a result, the network traffic required to replicate a database may be substantially reduced by sending database queries when the query affects a large enough number of rows that merit the execution of the query on the replicated database. Note that the row operations corresponding to the delete statement at records 14-23 could be omitted depending on the specific application and data needs of the user or application that uses the journal. The preferred embodiments expressly extend to dynamically deciding based on any suitable parameter whether or not to store database queries to the journal, and whether or not to store in the journal the corresponding row operations for a stored database query. In addition, the database replication send mechanism (e.g., 710 in FIG. 7) may dynamically decide whether to send a stored database query or its corresponding row operations. For example, if the load on the processor of the computer system that hosts the replicated database is heavily loaded, it may be preferable to send the row operations, thereby consuming additional network bandwidth, rather than sending the database query, which would consume processor bandwidth. The preferred embodiments expressly extend to dynamically deciding whether to store database queries, corresponding row operations, or both in a database journal, and to dynamically deciding whether to transmit from a database journal a stored database query and/or its corresponding row operations according to any suitable predetermined threshold.

Note that the examples given herein relate to database replication. Note, however, that the present invention is not limited to a database replication environment. The preferred embodiments expressly extend to storing both row operations and database queries to a database journal, regardless of how this information is used. For example, the database queries in the journal could be used during rollback analysis (when a transaction fails) to determine which query is the root cause of the rollback. In addition, in the event of a failure, the queries in the journal could be useful in determining what the application state was at the time of the failure. This information could be used to do first pass problem analysis/understanding and reconstruction of the error situation without requiring access to other program logs.

The preferred embodiments store database queries to a database journal, in addition to row operations. The database queries in the database journal may be used in any suitable way. One suitable way relates to database replication, where the database query may be sent to a computer system that hosts a replicated database for execution on the replicated database, instead of sending the individual row operations that correspond to the database query. As a result, network traffic is reduced, which enhances system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A first computer system comprising:
at least one processor;
a memory coupled to the at least one processor;
a first database residing in the memory;
a database journal for the first database residing in the memory that stores changes to the first database, the stored changes to the first database comprising a first plurality of row operations corresponding to a first plurality of database queries to the first database and a second plurality of database queries to the first database;
a database journal mechanism residing in the memory and executed by the at least one processor, the database journal mechanism storing a selected database query to the first database in the database journal as one of the second plurality of database queries when the selected database query is executed on the first database if a number of rows affected by the selected database query exceeds a predetermined threshold, and if the number of rows affected by the selected database query does not exceed the predetermined threshold, storing a plurality of row operations corresponding to the selected database query in the database journal as some of the first plurality of row operations; and
a database replication send mechanism residing in the memory and executed by the at least one processor, the database replication send mechanism selecting an entry in the database journal, determining whether the selected entry in the database journal comprises the selected database query, and if the selected entry in the database journal comprises the selected database query, transmitting the selected entry to a second computer system that comprises a second database that replicates the first database using database journal entries received from the first computer system, and if the selected entry in the database journal comprises a row operation and the row operation does not correspond to any database query previously transmitted to the second computer system, transmitting the selected entry to the second computer system.

2. The first computer system of claim 1 wherein the database journal further comprises a second plurality of row operations that corresponds to at least one of the second plurality of database queries.

3. The first computer system of claim 1 further comprising a journal configuration mechanism that determines at least one type of database query that is stored in the database journal.

4. A computer-implemented method for writing a plurality of entries to a database journal, each of the plurality of entries representing a change to a first database in a first computer system, the change to the first database in the first computer system comprising a first plurality of row operations corresponding to a first plurality of database queries to the first database and a second plurality of database queries to the first database, and for transmitting at least some of the plurality of entries in the database journal to a second computer system, the method comprising the steps of:
providing at least one processor in the first computer system;

providing memory coupled to the at least one processor in the first computer system;

writing a selected database query to the first database to the database journal when the selected database query to the first database is executed on the first database if a number of rows affected by the selected database query exceeds a predetermined threshold;

writing a plurality of row operations corresponding to the selected database query to the database journal as some of the first plurality of row operations;

selecting an entry from the written plurality of entries in the database journal; and determining whether the selected entry in the database journal comprises the selected database query;

if the selected entry in the database journal comprises the selected database query, transmitting the selected entry to the second computer system for replication of the first database to a second database in the second computer system; and if the selected entry in the database journal comprises a row operation and the row operation does not correspond to any database query previously transmitted to the second computer system, transmitting the selected entry to the second computer system.

5. The method of claim 4 further comprising a step of writing a second plurality of row operations that corresponds to at least one of the second plurality of database queries to the database journal.

6. The method of claim 4 further comprising a step of determining at least one type of database query that is written in the database journal.

7. The method of claim 4 further comprising a step of maintaining the second database in the second computer system by executing the selected database query in the database journal on the second database.

8. A computer-readable recordable media bearing a computer program, the computer program comprising:

(A) a database journal mechanism that stores changes to a first database in a database journal, the stored changes to the first database comprising a first plurality of row operations corresponding to a first plurality of database queries to the first database and a second plurality of database queries to the first database, and stores a selected database query to the first database in the database journal when the selected database query is executed on the first database if a number of rows affected by the selected database query exceeds a predetermined threshold, and if the number of rows affected by the selected database query does not exceed the predetermined threshold, stores a plurality of row operations corresponding to the selected database query in the database journal as some of the first plurality of row operations; and (B) a database replication send mechanism selecting an entry in the database journal, determining whether the selected entry in the database journal comprises the selected database query, and if the selected entry in the database journal comprises the selected database query, transmitting the selected entry to a second computer system that comprises a second database that replicates the first database using database journal entries received from the first computer systems, and if the selected entry in the database journal comprises a row operation and the row operation does not correspond to any database query previously transmitted to the second computer system, transmitting the selected entry to the second computer system.

9. The computer-readable recordable media of claim 8 wherein the database journal further comprises a second plurality of row operations that corresponds to at least one of the second plurality of database queries.

10. The computer-readable recordable media of claim 8 further comprising a journal configuration mechanism that determines at least one type of database query that is stored in the database journal.

11. A method for replicating a first database on a first computer system to a second database on a second computer system, the method comprising the steps of:

on the first computer system, performing the steps of:
(A) executing a first database query to the first database;
(B) determining a number of rows affected by the first database query executed in (A);
(C) if the number of rows affected by the first database query is greater than a predetermined threshold, writing the first database query to a first database journal;
(D) writing a first row operation corresponding to the first database query to the first database journal;
(E) selecting an entry in the first database journal;
(F) determining whether the selected entry in the first database journal comprises the first database query;
(G) if the selected entry in the first database journal comprises the first database query, transmitting the selected entry to the second computer system, and not transmitting any row operations in the first database journal corresponding to the first database query to the second computer system;
(H) if the selected entry in the first database journal comprises a second row operation, transmitting the selected entry to the second computer system if the second row operation does not correspond to any database query previously transmitted; and
(I) repeating steps (E) through (H) for each entry in the first database journal; on the second computer system, performing the steps of:
(J) receiving a plurality of entries from the first computer system transmitted in steps (G) and (H);
(K) if an entry received in step (J) comprises a row operation, applying the row operation to the second database in the second computer system; and
(L) if the entry in step (K) comprises a database query, executing the database query on the second database in the second computer system.

* * * * *